J. F. WHITE.
CUSHION TIRE FOR VEHICLES.
APPLICATION FILED JULY 15, 1915.
1,179,884.
Patented Apr. 18, 1916.
2 SHEETS—SHEET 1.
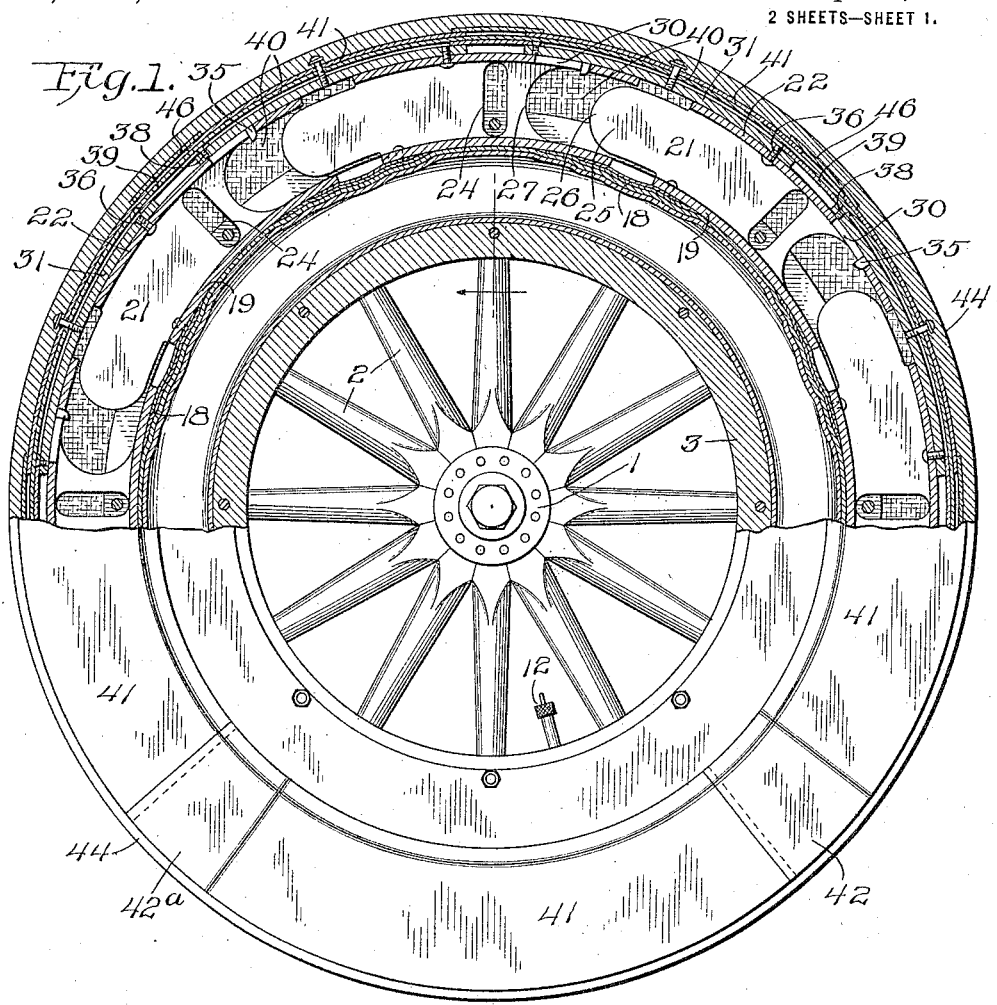
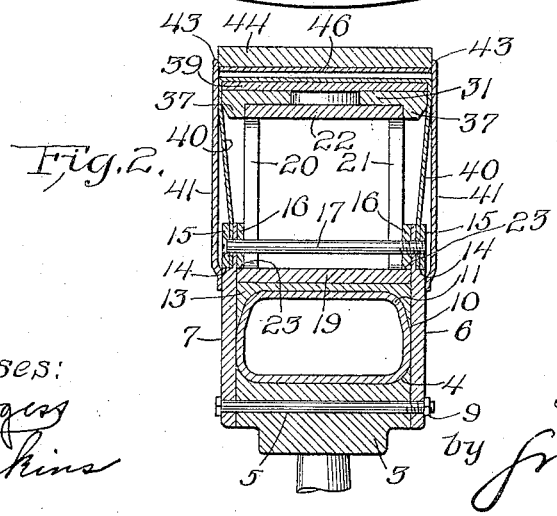

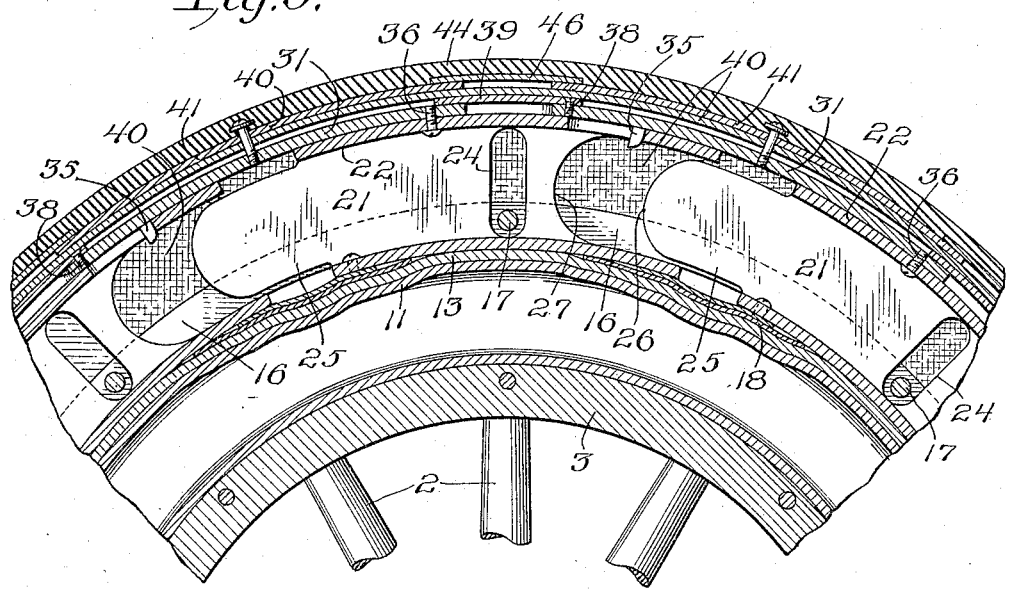
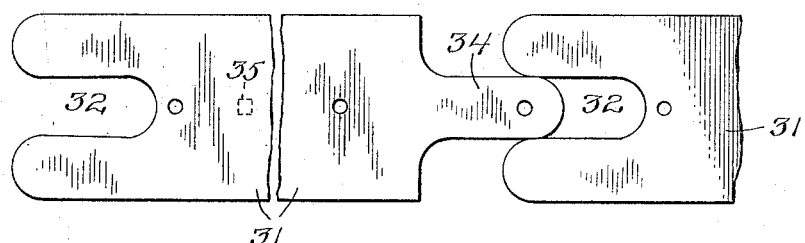
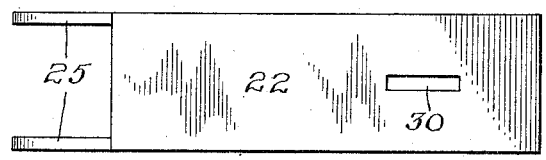

UNITED STATES PATENT OFFICE.

JOHN F. WHITE, OF PITTSBURGH, PENNSYLVANIA.

CUSHION-TIRE FOR VEHICLES.

1,179,884.   Specification of Letters Patent.   Patented Apr. 18, 1916.

Application filed July 15, 1915. Serial No. 40,102.

*To all whom it may concern:*

Be it known that I, JOHN F. WHITE, a citizen of the United States, residing at Pittsburgh, in the county of Allegheny and State of Pennsylvania, have invented certain new and useful Improvements in Cushion-Tires for Vehicles, of which the following is a specification.

This invention relates to cushion tires for vehicles, more particularly motor vehicles, and has for its object to provide a tire of such type, with means in a manner as hereinafter set forth, for overcoming the danger of punctures and blow-outs, at the same time possessing the cushioning characteristics of the ordinary type of pneumatic tire now in general use.

A further object of the invention is to provide a cushion tire, having means in a manner as hereinafter set forth, for equalizing the pressure of a load upon the tire during the travel thereof.

Further objects of the invention are to provide a cushion tire possessing the characteristics set forth and which is comparatively simple in its construction and arrangement, strong, durable, efficient in its use, and readily set up.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is an elevation, partly in section, of a wheel showing the adaptation therewith of a tire in accordance with this invention. Fig. 2 is a cross sectional view through the tire and wheel rim. Fig. 3 is an enlarged longitudinal section through the tire and wheel rim. Figs. 4 and 5 are details.

Referring to the drawings in detail 1 denotes a wheel hub, 2 the spokes and 3 the felly having its periphery grooved as at 4 and the said felly 3 is furthermore provided with transverse openings 5.

A cushion tire in accordance with this invention includes an inner or cushioning section, an intermediate or pressure equalizing section, and an outer or tread section.

The inner section consists of a pair of annular plates 6, 7, each are positioned against the sides of the felly 3 and are fixedly secured therewith with transverse headed bolts which extend through the openings 5 and plates 6, 7, and are provided with nuts 9. The width of the plates 6, 7, is materially greater than the thickness of the felly 3 and the said plates 6, 7, have their inner edge flush with the inner face of the felly. Under such circumstances said plates 6, 7, project outwardly from the felly 3 and form in connection with the latter annular channel 10. Arranged within the channel 10 and mounted in a groove 4, as well as projecting therefrom, is a cushioning element 11, as illustrated of a type similar to the inner tube now employed in pneumatic tires and communicating with said element 11 is a valve tube 12, which extends through the felly 3 and is capable of being connected to an air pump whereby the cushioning element can be inflated and constitute an air chamber. Arranged within the channel 10, upon the element 11, is a flexible protector 13 therefor. The protector 13 is annular in contour. The plates 6, 7, have the marginal portions thereof, at their outer edge, cut away to provide shoulders 14 and mounted upon these latter are clamping rings 15 for a purpose to be presently referred to. Positioned against the inner faces of the plates 6, 7, are retaining rings 16, for a purpose to be presently referred to. The clamping rings 15 and retaining rings 16 are connected with the plates 6, 7, by transverse extending headed bolts 17, which have their heads countersunk in one of the clamping rings 15 and their other ends have threaded engagement with the other clamping ring 15. The bolts 17 extend through the plate 7 and one retaining ring 16 and have threaded engagement with the other retaining ring 16 and the plate 6. The protector 13, has connected to its outer face, a series of flexible wear plates 18, preferably constructed of thin spring material and which are arranged at equal distant points and the function of the wear plates 18 will be presently referred to.

The intermediate section includes a series of inner engaging segment-shaped shiftable casings and as each of the casings is of the same construction, but one will be described as the description of one applies to the other. Each of said casings includes a segment-shaped bottom 19, a pair of side walls 20, 21, and a top 22. The side walls 20, 21, are inset with respect to the bottom 19 thereby providing ledges 23. The top 22 is flushed with the outer faces of the side walls 20, 21. The bottom 19 is positioned within the channel 10 and is maintained therein by the retaining plate 16. The side walls 20, 21, have transverse oval-shape openings 24 which are arranged in alinement and through which extends a bolt 17. The side walls 20, 21 at one end project from one end of the bottom 19, as at 25, and are rounded as at 26. The side walls 20, 21 at the other end terminate inwardly with respect to the other end of the bottom 19 and are curved inwardly as at 27 to provide a pocket. When the casings are set up with respect to each other, the projecting ends 25 of the side walls 20, 21, of one casing overlap the bottom 19 of an adjacent casing and are adapted to be shifted into the pockets 27 of said adjacent casing. Under such circumstances a series of inter-engaging casings are set up with respect to each other. The top 22 of each casing is of greater radius than the bottom 19 and said top 22, is provided, near each end, centrally thereof, with a longitudinally extending slot 30. Associated with each of the shiftable casings of the intermediate section is a pair of guide members and the guide members of one casing inter-engage with the guide members of two adjacent casings and constitute means to prevent sidewise movement of the casings during the shifting movement thereof. Each of the guide members of each casing consists of a segment-shaped plate 31 having one end bifurcated at 32 and its other end provided with a tongue 34. Each of the guide members intermediate its ends is formed with a depending lug 35 which operates in a slot 30 of the top of an adjacent casing. Each guide member has its tongue 34, fixedly secured by hold fast devices 36 to the top of a casing and said guide member is so arranged that it will project from such casing and extend over and upon an adjacent casing and the lug 35 of said guide member will project into the opening 30 of said last mentioned casing. Under such conditions a guide member is fixedly secured to one casing and operatively connected to an adjacent casing. The guide members are provided with depending flanges 37 which overlap the tops 22 of the casings and as clearly illustrated in Fig. 2. Connected to the bifurcated end of each guide member by the hold fast devices 38, as well as projecting from the said bifurcated end and upon an adjacent guide member is a bridge plate 39 and the said bridge plates are employed for closing the gap between the opposing ends of the guide members and owing to the manner in which they are set up, one end thereof, will shift upon that guide member to which the plate is not connected. Inclosing the shiftable casings and extending over the guide and bridge members is a cover 40 formed of flexible material, preferably fabric, and the said cover is secured to the plates 6, 7, by the clamping rings 15. The cover is interposed between the said clamping rings and the plates 6, 7, as illustrated in Fig. 2, and in connection with the bolt 17, the cover is fixedly secured to the inner section.

The outer or tread section consists of a series of inverted yoke-shape casings 41 and each of said casings is provided at each end with side extensions. The side extension at one end of each casing 41 is indicated at 42 and the side extension at the other end of each casing 41 is indicated at 42$^a$. The extension 42$^a$ of each casing 41 are offset with respect thereto and the extensions 42$^a$ of one casing overlap the extensions 42 of the other casings and under such conditions the sides of the outer or tread section are permanently closed. The casings 41 are flanged as at 43, and the flanges of the said casings 41 constitute retaining members for a tread 44, which is mounted against the casings 41 and bridge pieces 42 and between the flanges 43. Preferably the tread 44 is constructed of resilient material but it is obvious that the tread may be of any material desired. The casings 41 are secured to the guide members 31 by suitable hold fast devices. The shiftable casings of the intermediate section have secured to the bottom thereof resilient bridge pieces 46. Each resilient bridge piece 46 is secured to one casing and extends into and engages the outer face of the bottom of an adjacent casing under such conditions bridging the space between the casings. The resilient bridge pieces 40 slide against the wear plates 18. The cover 40, as well as the casings 41, 42, prevent dirt or foreign substances entering the intermediate section. The openings 24 permit of the radial as well as circumferential movement of the elements of the inner section. The plates 6, 7, as well as the protector 13, reduce the possibility of puncture of the tube 11 and said protector 13 also overcomes wear upon the tube 11 during the shifting movement of the casings of the intermediate section. The sides of the casings 41, 42, have their free terminus inset so as to ride against the outer face of the plates 6, 7. The guide members or segment-shaped members 31 are arranged to bridge between the centers or near the centers of the tops of two of the shiftable casings, that is, the ends of the guide plates 31, press inward on the tops 22 near the centers of the shiftable casings, making a series of bridges, as it were, between the center top of one casing to near the center top of the next casing and so on all around the tire. In this way the pressure or compression is equalized as the load is shifted from center to center of the casings and at no time is the entire load or pressure on the ends of the shiftable casings. When the load or pressure point is opposite the ends 32 or tongue 34 the load then is on the center of the casing corresponding to this particular end and tongue. When this casing is pressed inward it tends to draw in with it the near ends of the casings on each end of it making a section of the tire under pressure equal to more than the length of said casing so thereby if the guide members or bridges 31 were not used to bridge from one casing to the next casing, there would be an unequal pressure or soft spot in the tire where the load would be on the ends of the casings. The shiftable casings and guide members of the inner section are employed for the purpose of equalizing the pressure of the load upon the tire during the revolving of the wheel and this is obvious as said casings will shift radially.

What I claim is:—

1. A tire for vehicles comprising an inner section having a protected element to constitute an air chamber, an intermediate section cushioned by said protected element and including radially shiftable interengaging and connected pressure equalizing elements, and an outer section surrounding said elements and including a tread element.

2. A tire for vehicles comprising an inner section having a protected element to constitute an air chamber, an intermediate section cushioned by said protected element and including radially shiftable interengaging and connected pressure equalizing elements, and an outer section surrounding said elements and including a tread element, said inner section further including a cover for inclosing said pressure equalizing elements.

3. A tire for vehicles comprising an inner section having a protected element to constitute an air chamber, an intermediate section cushioned by said protected element and including radially shiftable interengaging and connected pressure equalizing elements, and an outer section surrounding said elements and including a tread element, said inner section further including guide members to prevent side-wise movement of said pressure equalizing elements.

4. A tire for vehicles comprising an inner section having a protected element to constitute an air chamber, an intermediate section cushioned by said protected element and including radially shiftable inter-engaging and connected pressure equalizing elements, and an outer section surrounding said elements and including a tread element, said inner section further including guide members to prevent side-wise movement of said pressure equalizing elements, and said inner section further including a cover for inclosing said members and said pressure equalizing elements.

5. A tire for vehicles comprising an inner section having a protected element to constitute an air chamber, an intermediate section cushioned by said protected element and including radially shiftable inter-engaging and connected pressure equalizing elements, and an outer section surrounding said elements and including a tread element, said inner section further including guide members to prevent side-wise movement of said pressure equalizing elements, and said inner section further including a cover for inclosing said members and said pressure equalizing elements, and said outer section having means to inclose said cover.

6. A tire for vehicles comprising an inner section having a protected element to constitute an air chamber, an intermediate section cushioned by said protected element and including radially shiftable inter-engaging and connected pressure equalizing elements, and an outer section surrounding said elements and including a tread element, said inner section further including a cover for inclosing said pressure equalizing elements, and said outer section having means to inclose said cover.

7. A tire for vehicles comprising an inner section having a protected element to constitute an air chamber, an intermediate section cushioned by said protected element and including radially shiftable inter-engaging and connected pressure equalizing elements, and an outer section surrounding said elements and including a tread element, said inner section further including a cover for inclosing said pressure equalizing elements, said members sliding against said inner section.

8. A tire for vehicles comprising an inner section having a protected element to constitute an air chamber, an intermediate section cushioned by said protected element and including radially shiftable inter-engaging and connected pressure equalizing elements, and an outer section surrounding said elements and including a tread element, and said inner section having bridge pieces to span the space between said pressure equalizing elements.

9. A tire for vehicles comprising an inner section having a protected element to constitute an air chamber, an inner section cushioned by said protected element and including radially shiftable connected pressure equalizing elements, and an outer section surrounding said elements and including a tread element.

10. A tire for vehicles comprising an inner section having a protected element to constitute an air chamber, an inner section cushioned by said protected element and including radially shiftable connected pressure equalizing elements, and an outer section surrounding said elements and including a tread element, said inner section further including a cover for inclosing said pressure equalizing elements.

11. A tire for vehicles comprising an inner section having a protected element to constitute an air chamber, an inner section cushioned by said element and including radially shiftable and connected pressure equalizing elements, and an outer section surrounding said elements and including a tread element, and said inner section having bridge spaces to span the space between said pressure equalizing elements.

12. A tire for vehicles comprising an inner, intermediate and outer section, said inner section having a protected element to constitute an air chamber, said inner section cushioned by said element and including radially shiftable inner-engaging and connected pressure equalizing elements, and said outer section surrounding said equalizing elements.

13. A tire comprising an inner section including a cushioning element, an intermediate section formed of a series of radially shiftable connected elements mounted upon said cushioning element, an outer section inclosing said shiftable elements, and bridge pieces arranged outwardly with respect to said equalizing elements and spanning the spaces between said elements.

In testimony whereof I affix my signature in the presence of two witnesses.

JOHN F. WHITE.

Witnesses:
LUELLA H. SIMON,
B. O. JENKINS.

Copies of this patent may be obtained for five cents each, by addressing the "Commissioner of Patents, Washington, D. C."